US008510967B2

(12) United States Patent
Tarizzo

(10) Patent No.: US 8,510,967 B2
(45) Date of Patent: Aug. 20, 2013

(54) BED FOR A COORDINATE MEASURING MACHINE

(75) Inventor: Alberto Tarizzo, Turin (IT)

(73) Assignee: Hexagon Metrology S.p.A., Moncalieri (IT)

( * ) Notice: Subject to any disclaimer, the term of this patent is extended or adjusted under 35 U.S.C. 154(b) by 232 days.

(21) Appl. No.: 13/172,243

(22) Filed: Jun. 29, 2011

(65) Prior Publication Data

US 2012/0000083 A1 Jan. 5, 2012

(30) Foreign Application Priority Data

Jun. 30, 2010 (EP) .................................... 10425219

(51) Int. Cl.
*G01B 5/008* (2006.01)

(52) U.S. Cl.
USPC ............................................. 33/503; 33/1 M

(58) Field of Classification Search
USPC ................................... 33/503, 1 M, 559, 556
See application file for complete search history.

(56) References Cited

U.S. PATENT DOCUMENTS

| | | | | |
|---|---|---|---|---|
| 4,495,703 | A * | 1/1985 | Sakata et al. | 33/503 |
| 5,402,981 | A * | 4/1995 | McMurtry | 33/503 |
| 6,161,294 | A * | 12/2000 | Bland et al. | 33/1 M |
| 6,438,857 | B2 * | 8/2002 | Jacobs et al. | 33/503 |
| 7,051,449 | B2 * | 5/2006 | Eichner et al. | 33/503 |
| 7,271,879 | B2 * | 9/2007 | Lim et al. | 355/75 |
| 2001/0013177 | A1 * | 8/2001 | Jacobs et al. | 33/503 |
| 2005/0086821 | A1 * | 4/2005 | Eichner et al. | 33/503 |
| 2011/0296701 | A1 * | 12/2011 | Tarizzo | 33/503 |
| 2012/0000083 | A1 * | 1/2012 | Tarizzo | 33/503 |

FOREIGN PATENT DOCUMENTS

| | | |
|---|---|---|
| EP | 1 854 577 | 11/2007 |
| EP | 2 100 693 | 9/2009 |
| GB | 2080954 | 2/1982 |
| WO | 89/03505 | 4/1989 |
| WO | 2009/139014 | 11/2009 |
| WO | WO 2009139014 A1 * | 11/2009 |

OTHER PUBLICATIONS

European Search Report issued in corresponding European Patent Application No. EP 10 42 5219.

* cited by examiner

*Primary Examiner* — Yaritza Guadalupe-McCall
(74) *Attorney, Agent, or Firm* — Maschoff Brennan

(57) ABSTRACT

A bed for a measuring machine constituted by a frame provided with a pair of mutually parallel beams bearing guides for the mobile unit of the machine, and a workpiece table housed between the beams; the workpiece table and the frame are constrained to one another by constraint means that decouple the deformations thereof, and the frame comprises at least one cross-member connected to respective intermediate portions of the beams.

15 Claims, 5 Drawing Sheets

BED FOR A COORDINATE MEASURING MACHINE

CROSS REFERENCE TO RELATED APPLICATIONS

This application claims priority to European Patent Application No. 10425219.2 filed on Jun. 30, 2010, the contents of which are hereby incorporated by reference herein.

TECHNICAL FIELD

The present invention relates to a bed for a coordinate measuring machine.

BACKGROUND ART

As is known, coordinate measuring machines generally comprise a bed designed to support the workpiece to be measured and a mobile unit for moving a measuring sensor with respect to the bed.

More in particular, the mobile unit generally comprises a first carriage that is mobile on the bed along guides parallel to a first axis, a second carriage carried by the first carriage and mobile along a second axis orthogonal to the first axis, and a third carriage carried by the second carriage and mobile with respect to this along a third axis orthogonal to the first two axes. The measuring sensor is carried by the third carriage.

In machines of the type briefly described above, the bed is normally made of granite, and has the dual purpose of supporting the workpiece and of defining the guides for the first carriage.

This involves a series of drawbacks.

In the first place, the positioning of the workpiece on the bed, particularly in the case where the weight of the workpiece is considerable, leads to a deformation of the bed itself, which causes a deformation of the guides and hence induces errors of measurement.

Furthermore, the movement of the carriages of the mobile unit along the guides, and in particular of the main carriage, induces deformations on the bed and hence alters the disposition of the workpiece. Further measurement errors are thus introduced.

Other drawbacks linked to the use of beds made of granite are constituted by the cost, weight, and difficulty of supply of the granite in a short time.

To solve at least partially the problems linked to the workpiece weight, solutions have been proposed in which the granite bed is decoupled from the supporting structure.

Illustrated in WO 89/03505 is a measuring machine comprising a metal base bearing the guides for the mobile unit, and resting on which is a workpiece table made of granite.

Illustrated in GB-A-2080954 is a measuring machine in which a workpiece table made of hard mineral material is constrained to an underlying metal base, provided with the guides for the mobile unit, via positioning elements without play and such as not to transmit stresses.

Both of the solutions described above call for complex and costly base structures and, in any case, use a granite table, with all the drawbacks that this entails.

WO 2009/139014 illustrates a coordinate measuring machine in which, in order to solve the problems referred to above, the bed comprises a perimetral metal frame provided with guides for the mobile unit and a workpiece table housed within the frame, in which the workpiece table and the frame are constrained to one another by constraint means of an isostatic type that decouple the deformations thereof.

DISCLOSURE OF INVENTION

The aim of the present invention is to provide an improvement of the machine referred to above that will be simpler, less costly, and faster to set up.

The aforesaid aim is achieved by a coordinate measuring machine according to claim 1.

BRIEF DESCRIPTION OF THE DRAWINGS

For a better understanding of the present invention, described in what follows are some preferred embodiments, provided by way of non-limiting examples with reference to the attached drawings, wherein.

BEST MODE FOR CARRYING OUT THE INVENTION

Figure 1:
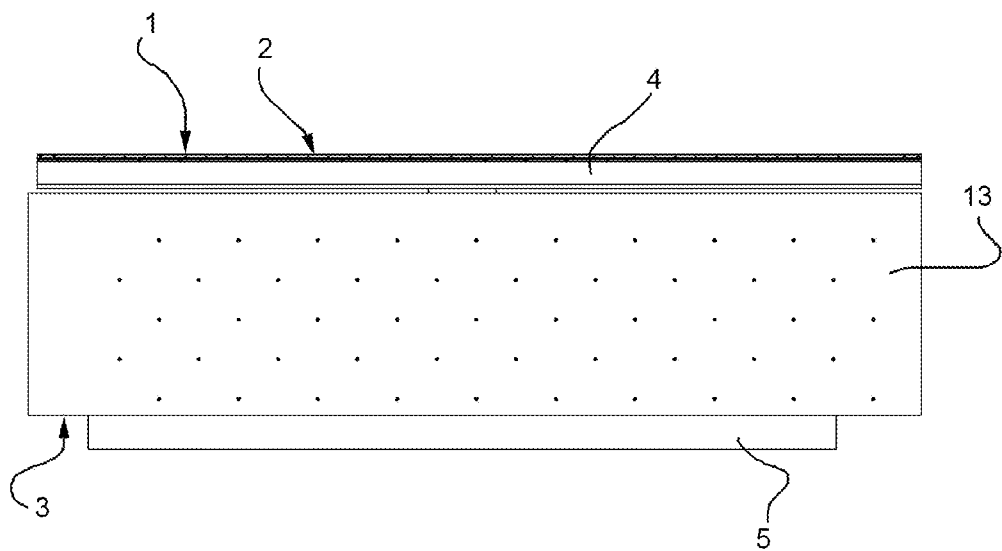
FIG. 1 is a top plan view of a bed of a coordinate measuring machine according to the present invention.

With reference to FIG. 1, designated as a whole by 1 is a bed for a measuring machine.

The bed 1 basically comprises a metal frame 2 and a workpiece table 3 supported by the frame 2 and conveniently made of a pourable material, preferably concrete.

Figure 2:
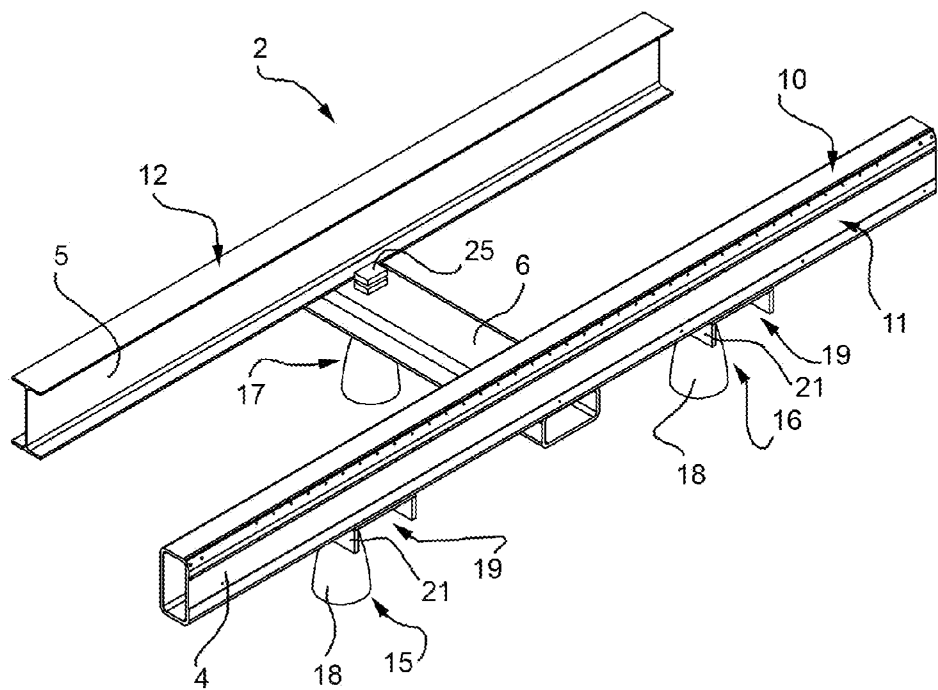
FIG. 2 is a perspective view of a frame of the bed of FIG. 1, from above and from one side.
Figure 3:
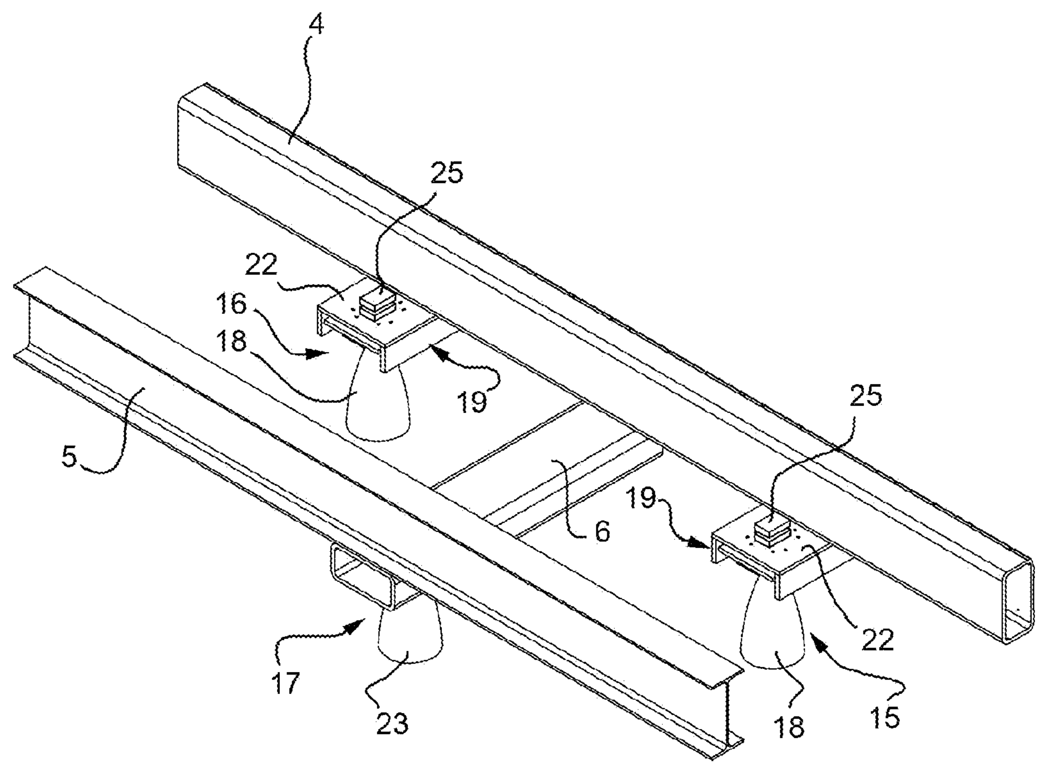
FIG. 3 is a perspective view of the frame of FIG. 2, from above and from an opposite side.
Figure 4:
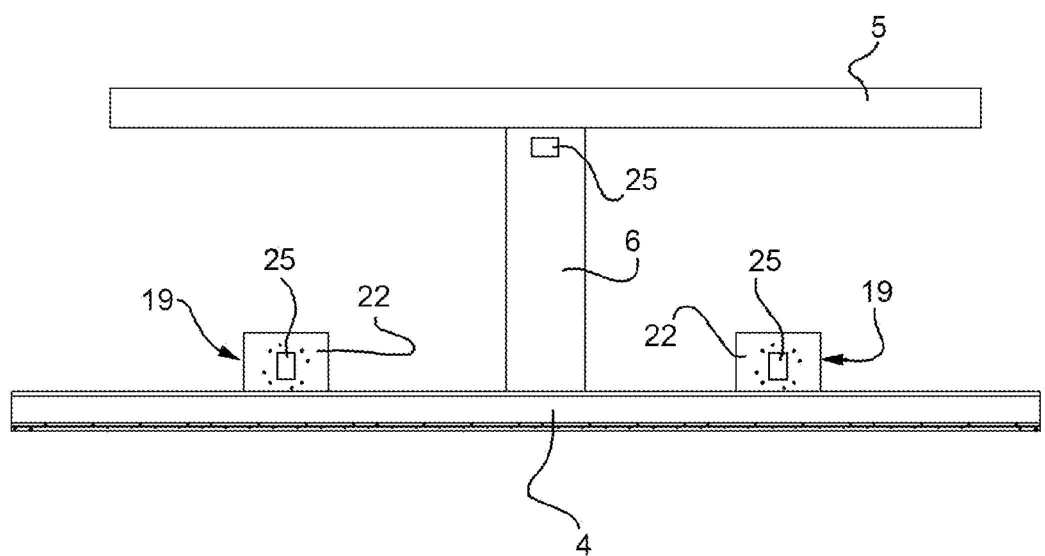
FIG. 4 is a top plan view of the frame of FIG. 2.

According to a first embodiment of the invention (FIGS. 2-4), the frame 2 is substantially shaped like an H and comprises a pair of parallel longitudinal beams 4, 5 spaced apart from one another, and a cross-member 6 perpendicular to the beams 4, 5 and rigidly connected to these at their centres.

The cross-member 6 conveniently has a hollow rectangular cross section. The beams 4, 5 rest on the cross-member 6, to which they are fixed in a conventional way (not illustrated).

The beam 4 is conveniently constituted by a sectional element with a hollow rectangular cross section, and carries a top guide 10 and a side guide 11 (FIG. 2) for a main carriage of the machine (not illustrated). The beam 5 is conveniently constituted by a sectional element having an I-shaped cross section, and carries at the top a third guide 12 for the carriage.

Figure 5:
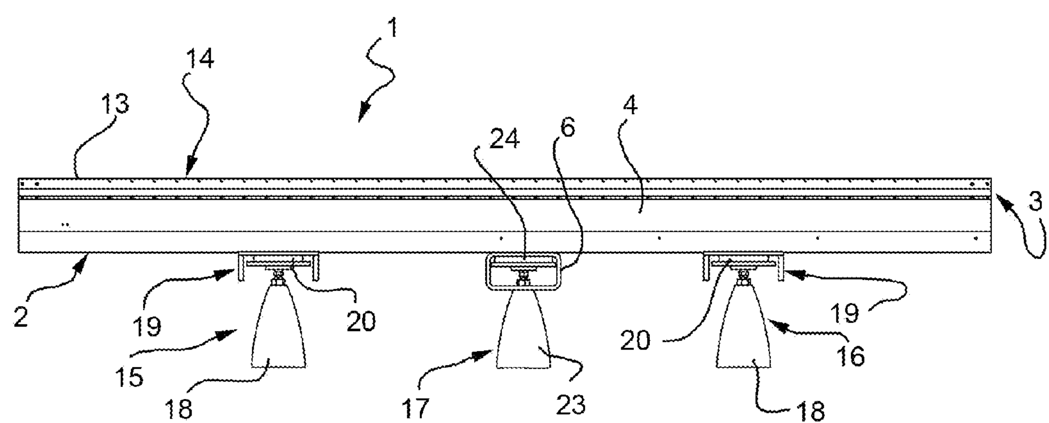
FIG. 5 is a side view of the bed of FIG. 2.

The workpiece table 3 is housed with lateral play between the beams 4, 5 (FIG. 1) and is conveniently covered over again with a top layer 13 of granite or ceramic material defining the working surface 14 of the measuring machine (FIG. 5).

The frame 2 rests on three supports 15, 16, 17, of which two (15, 16) are set in intermediate lateral areas of the beam 4, and one (17) is set underneath the cross-member 6, in the proximity of the beam 5.

The supports 15, 16 each comprise a resting foot 18 and a bracket 19, which is fixed on the resting foot 18 via an anti-vibration support 20 (FIG. 5).

The brackets 19 of the supports 15, 16 have a first portion 21 fixed underneath the beam 4 and a second portion 22 projecting in cantilever fashion from the beam 4 towards the inside of the frame 2. The resting feet 18 are set in the second portion 22.

The support 17 comprises a resting foot 23 fixed to the cross-member 6 via an anti-vibration support 24.

The workpiece table 3 is supported on the brackets 19 of the supports 15, 16 and on the cross-member 6 via constraint means 25 designed to decouple the deformations of the workpiece table 3 from those of the frame 2.

The constraint means 25 are located exactly on the vertical of the supports 15, 16, 17 in such a way that the constraint reactions exchanged through said constraint means do not have an arm with respect to the supports themselves.

Theoretically, to obtain a perfect decoupling between the workpiece table 3 and the frame 2 it is necessary for the constraint means 25 to define an isostatic constraint system. In practice, if the relative translations between the workpiece table 3 and the frame 2 can be considered negligible, the constraint means 35 can be of a statically indeterminate type provided that they enable at least the relative rotations.

An example of embodiment of the constraint means 25 is illustrated in WO 2009/139014, the description of which is incorporated herein for reference, for the parts necessary.

In the case where the relative translations cannot be considered negligible, it is necessary to envisage an isostatic constraint system.

In general, an isostatic constraint system is such if it eliminates all and only the six degrees of freedom of relative motion between the workpiece table 3 and the frame 2. To eliminate the six degrees of freedom, in general three constraints must be used: one constraint eliminates three degrees of freedom, one eliminates two degrees of freedom, and the third eliminates the residual degree of freedom.

Examples of isostatic constraints are provided in WO 2009/139014.

Figure 6:
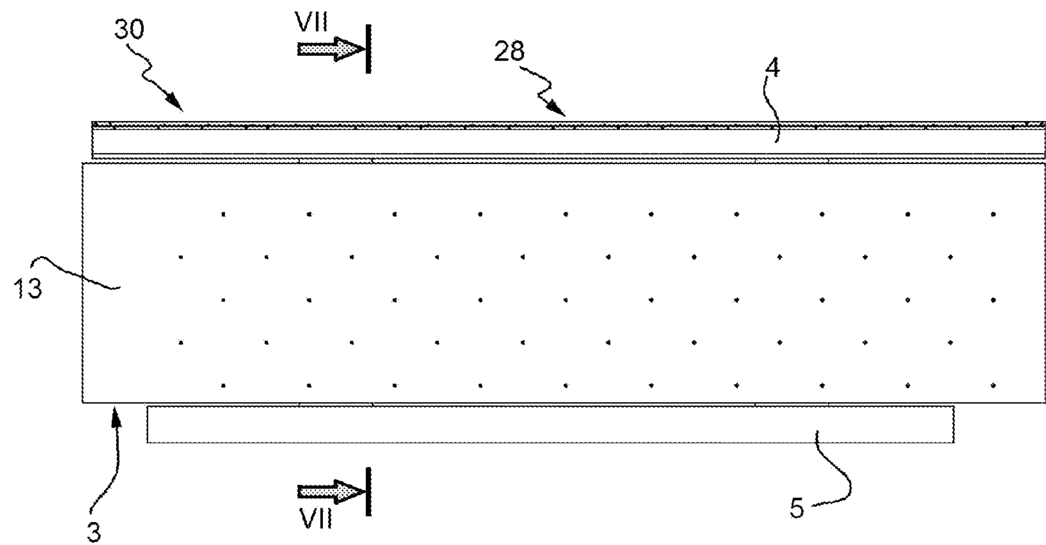
FIG. 6 is a top plan view of a second embodiment of the bed.
Figure 7:
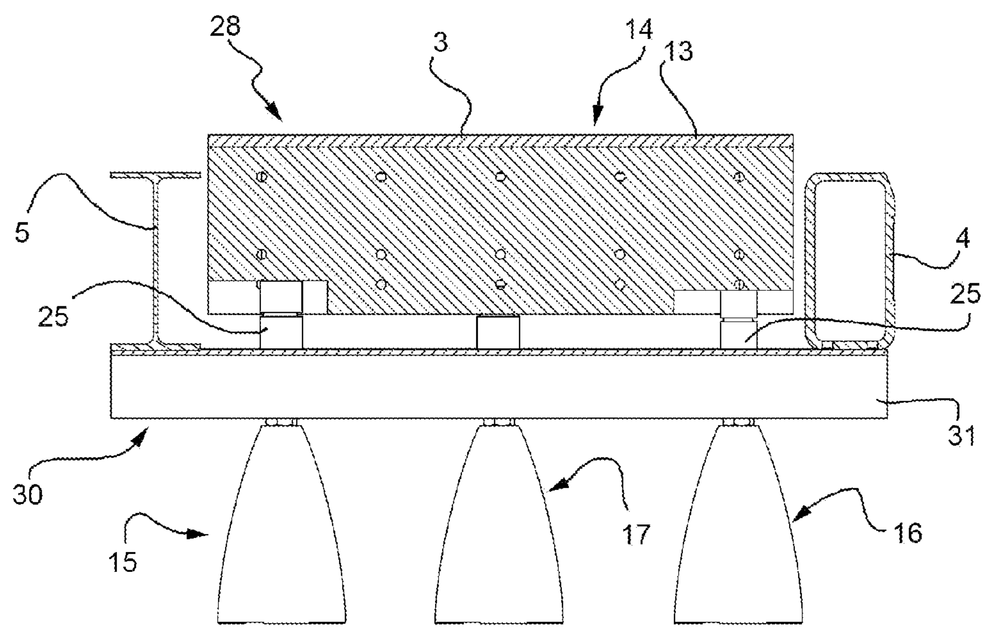
FIG. 7 is a cross section according to the line VII-VII of FIG. 6.
Figure 8:
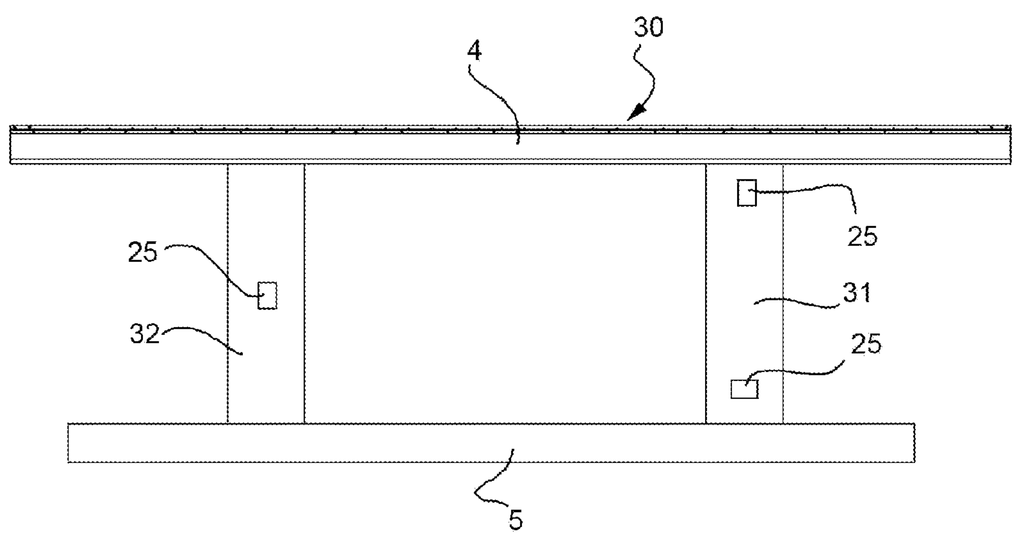
FIG. 8 is a top plan view of a frame of the bed of FIG. 6.
Figure 9:
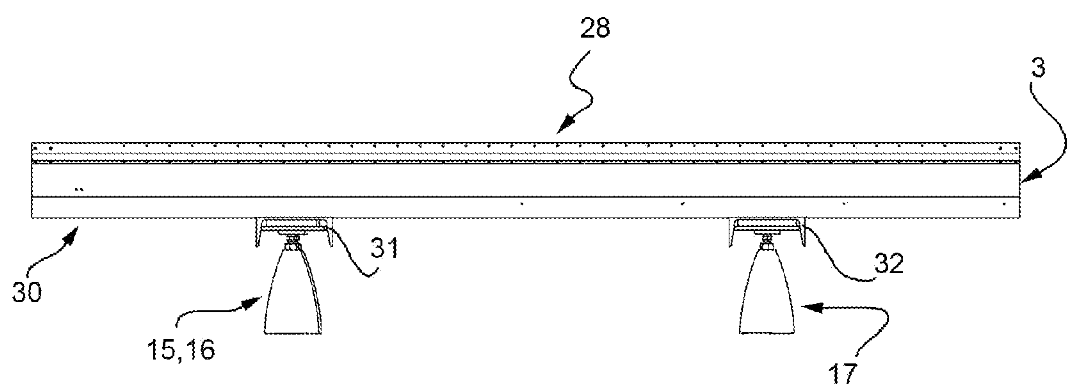
FIG. 9 is a side view of the bed of FIG. 6.
Figure 10:
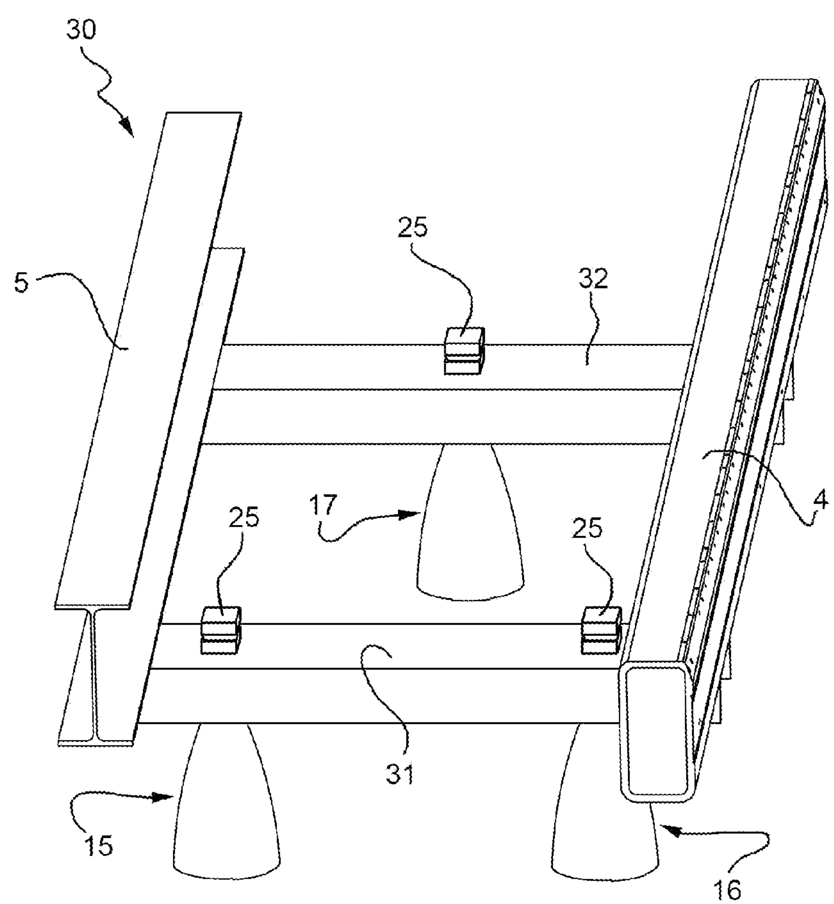
FIG. 10 is a perspective view of the frame of FIG. 8.

FIGS. 6 and 7 illustrate a second embodiment of the bed, designated by the number 28.

The bed 28 comprises a frame 30 that differs from the frame 2 described in that it comprises two cross-members 31, 32 parallel to one another and rigidly connected, at their own ends, with the beams 4 and 5 in an intermediate lateral area thereof. The cross-members 31, 32 have a cross section shaped like a U turned upside down, and the beams 4, 5 rest on the cross-members themselves.

In this case, the three supports 15, 16, 17 are set underneath the cross-members 31, 32; in particular, two supports (15, 16) are set in the proximity of the ends of the cross-member 31, with respect to the beams 4, 5, whilst the third support (17) is set in the centre of the cross-member 32.

The workpiece table 3 is supported on the cross-members 31, 32 via constraint means 25 designed to decouple the deformations of the workpiece table 3 from those of the frame 30.

The constraint means 25 are again set on the vertical of the supports 15, 16, 17.

From an examination of the characteristics of the bed 1 made according to the present invention, the advantages that it affords are evident.

Albeit achieving all the advantages linked to the decoupling of the deformations of the workpiece table from those of the frame, the structure of the latter is considerably simplified with respect to the solutions known previously.

In particular, a smaller number of pieces is used, assembly is faster, and the cost of the frame is lower.

The reduction of stiffness of the frame that follows inevitably from the use of an H frame or a frame with two cross-members with respect to a closed perimetral frame does not entail any drawback from the metrological standpoint in so far as the errors due to the major deformations of the guides can be corrected during geometrical compensation of the machine.

Modifications and variations may be made to the bed 1, 28 described, without thereby departing from the scope of protection of the claims.

The bed according to the invention can be used in coordinate measuring machines of any type, for example bridge or horizontal-arm measuring machines.

The workpiece table 3 can be made of a different material, for example a thermoplastic resin containing appropriate fillers.

Furthermore, the frame 2, 30 can be made with a plurality of beams made of composite or stone material instead of metal sectional elements.

Finally, in the embodiment in which the frame comprises two cross-members, these might not be parallel to one another.

The invention claimed is:

1. A bed for a coordinate measuring machine comprising:
- a frame provided with a pair of parallel beams spaced apart from one another;
- bearing guide means for a mobile unit of the machine; and
- a workpiece table at least partially housed between the beams, the workpiece table and the frame being constrained to one another by constraint means that decouple the deformations thereof, wherein the frame comprises at least one cross-member connected to respective intermediate portions of the beams.

2. The bed according to claim 1, wherein the beams rest on the cross-member.

3. The bed according to claim 1, wherein the frame rests on three supports and in that the constraint means are set on the vertical of said supports.

4. The bed according to claim 3, wherein the bed comprises two cross-members, a first support and a second support being set underneath the cross-members in the proximity of the respective beams, a third support being set underneath the other cross-member in the centre thereof.

5. The bed according to claim 4, wherein the two cross-members are parallel to one another.

6. The bed according to claim 3, wherein the constraint means are of isostatic type.

7. The bed according to claim 3, wherein the translations between the workpiece table and the frame due to the deformations are negligible, wherein said constraint means define a statically indeterminate constraint system that eliminates the translation degrees of freedom.

8. The bed according to claim 1, wherein the bed comprises a single cross-member, a first support and a second support being set underneath the beams, a third support being set underneath the cross-member in the proximity of the other beam.

9. The bed according to claim 8, wherein the first and second supports comprise a resting foot and a bracket set between the resting foot and the frame; the bracket of said first and second supports comprising a first portion fixed to the beam and a portion projecting from the beam towards the inside of the frame; the resting foot being set underneath the second portion of the bracket.

10. The bed according to claim 1, wherein said workpiece table is made at least prevalently of a pourable material.

11. The bed according to claim 10, wherein said material is a non-metallic material.

12. The bed according to claim 11, wherein said material is concrete.

13. The bed according to claim 12, wherein said second material is granite.

14. The bed according to claim 12, wherein said second material is a ceramic material.

15. The bed according to claim 1, wherein the bed comprises a top layer made of a second material and defining a working surface of the machine.

* * * * *